STORAGE DEVICE UTILIZING SEMICONDUCTOR

Filed Dec. 30, 1950 4 Sheets-Sheet 1

INVENTOR
F. GRAY
BY Harry C. Hart
ATTORNEY

INVENTOR
F. GRAY
BY Harry C. Hart
ATTORNEY

INVENTOR
F. GRAY
BY Harry C. Hart
ATTORNEY

INVENTOR
F. GRAY
BY Harry C. Hart
ATTORNEY

Patented Apr. 15, 1952

2,592,683

UNITED STATES PATENT OFFICE 2,592,683

STORAGE DEVICE UTILIZING SEMICONDUCTOR

Frank Gray, East Orange, N. J., assignor to Bell Telephone Laboratories, Incorporated, New York, N. Y., a corporation of New York Application December 30, 1950, Serial No. 203,643

17 Claims. (Cl. 313—330)

This invention relates to the translation of electric currents and particularly to the utilization of semiconductor materials in a novel manner to translate electric currents.

A principal object of the invention is to initiate the flow of a persistent current by the application of a momentary electric impulse. A realted object is to combine in a single structure the characteristics of amplification and memory.

Another object is to convert information in the form of a train of short electric impulses which appear on a single conductor and follow one another in time sequence into a space pattern of electric conditions among a multiplicity of different conductors, which conditions can endure in substantial independence of the passage of time until they are deliberately altered by erasure.

In Bardeen Patent 2,524,033, there is described a translating device for electric currents which comprises a block of semiconductor material such as P-type silicon or N-type germanium having a first electrode plated over a substantial area of one face thereof and making low resistance contact with the body of the block, a point electrode engaging the opposite face, biased in the reverse direction, and a control electrode close to the semiconductor block and to the point electrode but insulated from each of them by a thin film of insulating material. It is found that application of a signal to the control electrode modifies the current flowing in an external work circuit through the block from the base to the point contact electrode and across a high resistance barrier which is believed to exist in the interior of the block. Best results are obtained when the control electrode actually surrounds the point contact electrode.

It is believed that the action of that device is due to the setting up of an electric field across the film of insulation, which field extends into the body of the semiconductor material and modifies the number of mobile charges in at least a thin layer of the semiconductor material immediately under the insulating film and so the conductivity and resistance of this layer. Especially is this alteration significant in the immediate vicinity of the point contact electrode. Here, because the point contact electrode is worked in its reverse or high resistance direction, its contact resistance constitutes the major part of the resistance of a work circuit which interconnects the point contact electrode with the base and, therefore, the controlling part.

An application of Frank Gray, Serial No. 84,644, filed March 31, 1949, issued April 3, 1951, as Patent 2,547,386, is based on the discovery that the control electrode of the aforementioned Bardeen patent may be dispensed with and that the film of insulation which covers the surface of the semiconductor material may be subjected to an equivalent or even a superior electric field by charging it directly without resort to any specific mechanical electrode, as by bombarding it with the electrons of a cathode beam, i. e., the semiconductor triode is replaced by a semiconductor diode to whose surface a charge is applied by a cathode beam. It has been found that a very short pulse of comparatively weak beam current, for example, a 1/100 second pulse of current of 10 microamperes which supplies a charge of 1/10 microcoulomb, suffices to more than double the current flowing through the block to the collector, for example, to change it from less than .4 to more than .8 milliampere. It is pointed out in that application that the current which flows through the block from the base electrode to the point contact of the collector electrode is a function not so much of the voltage or current of an input signal as of the electric charge on the dielectric insulating layer, so that a very fleeting pulse of current, which places such a charge on this layer and leaves it there after the current pulse has passed, suffices to produce an enduring change in the collector current. This altered value of the collector current persists as long as the surface charge remains, and its magnitude is substantially proportional to the magnitude of this charge. The charge itself may be deliberately removed at will, for example, by again bombarding the surface with electrons of the same or another beam, but this time in the presence of a local field which withdraws secondary electrons in a ratio greater than unity.

The present invention offers a specific improvement over the invention of the earlier Gray application in that the electron beam, which requires a high voltage, is replaced by an ionized gas which requires only a low voltage. Briefly, the diode is enclosed, with a discharge electrode juxtaposed with the film, in an envelope containing an atmosphere of an inert ionizable gas at reduced pressure. Application of a momentary voltage pulse of suitable magnitude between the semiconductor and the discharge electrode ionizes the gas, and ions migrate toward the semiconductor, under the influence of the electric field which exists between it and the discharge electrode, and settle on the insulating film to constitute a dense surface charge in the vicinity of the collector. This charge, when of the correct sign, causes a manifold increase in the collector current. The correct sign for the surface charge is negative when the semiconductor is of N-type conductivity and positive when it is of P-type conductivity. The charge, and the consequent collector current increase, may be erased at will by reversing the polarity of the voltage on the discharge electrode.

In the absence of such deliberate erasure, the original surface charge leaks off due to the small residual conductivity of the material of the insulating layer, and the collector current decays correspondingly. The rate of this decay depends principally on the character and thickness of the insulating layer. These may be controlled within wide limits in fabrication so that a translating device constructed in accordance with the invention may be formed with a short decay time or a long one to suit particular needs.

The invention lends itself readily to the construction of a beam tube distributor wherein the target comprises a multiplicity of such individual insulated diodes, each with its properly biased point contact electrode and each with its individual discharge electrode. The blocks may be arranged in any desired array, such as a linear one or a circular, a spiral or a rectangular one, as desired. The glow discharge may be directed onto one or other of these blocks by application of the initiating voltage to the proper discharge electrode. Individual loads such as relays may be included in the circuits of the several collector electrodes. Settling of ions, when the discharge is turned on, on any particular semiconductor block, initiates the flow of current in the relay connected with its collector electrode; and this current persists long after the discharge has moved on to another diode to cause similar initiation of currents in others of the relays. When the actuation of the relay has served its purpose, the relay may be restored to its original condition by application of a positive voltage to the appropriate discharge electrode, which reverses the sign of the ionic surface charge on the film. If standard persistence is desired, each relay may be restored after the lapse of a preassigned time by suitable adjustment of the decay time of the diode. If simultaneous restoration of all of the relays is desired, the collector circuits may all be opened simultaneously.

Because of the fact that the area on the block surface of mutual influence between the beam-produced surface charge and the charge-sensitive collector is very small, the target may conveniently comprise a single large block or strip of semiconductor material having a number of individual collector electrodes making point contact with its surface at spaced points.

The invention will be fully apprehended from the following detailed description of preferred embodiments thereof, taken in connection with the appended drawings, in which.

Figure 1:
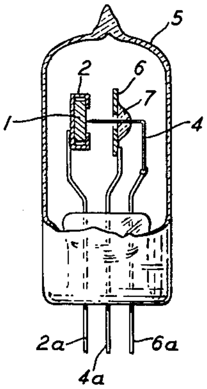
Fig. 1 shows an embodiment of the invention in the form of a storage tube, filled with an inert gas at reduced pressure, and comprising a semiconductor diode and a discharge electrode for passing a momentary glow discharge to the diode.
Figure 2A:
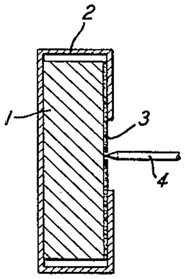
Fig. 2 is an enlarged view of the diode showing that the exposed surface of the semiconductor is covered with a thin insulating film for storing an electrical charge.
Figure 2B:
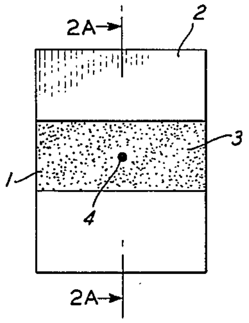

A storage tube incorporating certain features of the invention is shown in Fig. 1, and certain details are shown in the enlarged sketch of Fig. 2. Referring to these figures together, a small block of semiconductor 1 is embedded in a metallic base 2 and preferably in such a manner that the exposed surface of the semiconductor is bordered by an appreciable rim of the base. The unexposed surface of the block 1 is metal-plated to furnish good electrical connection with the base, and the exposed surface is coated with a thin film of insulator 3 in a manner that is subsequently described. A sharpened metallic wire 4 pierces the film and forms a point contact with the semiconductor beneath the film. This combined unit is known as a diode, and its metal wire 4 is designated as the collector.

Referring now to Fig. 1, it shows the semiconductor block 1 is mounted by way of its metal base 2 mounted in a glass envelope 5. A glow discharge electrode 6 in the form of a metal plate is located opposite the exposed surface of the semiconductor and at a short distance from the latter. The collector wire 4 is mounted in a ceramic insulator 7 and extends through an aperture in electrode 6 to make contact with the semiconductor. The base 2, the discharge electrode 6, and the collector 4 are provided with leads 2_a_, 4_a_, 6_a_ passing through the glass envelope 5, and these leads may also serve as mechanical supports for the elements. The envelope is filled with an inert gas, such as neon or argon, at a reduced pressure so that a glow discharge can pass easily from electrode 6 to base 2 when sufficient voltage is applied to the corresponding leads. The whole assembly is termed a storage tube.

Figure 3:
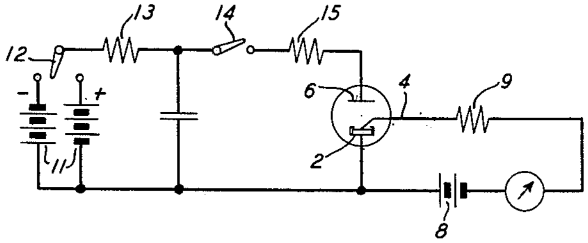
Fig. 3 is a schematic diagram of a circuit for examining the characteristics of a storage tube.

Fig. 3 is a schematic diagram showing a circuit for examining the characteristics of a storage tube, such as that of Fig. 1. The positive terminal of a voltage source 8 is connected to the base 2 of the diode, and the negative terminal is connected to the collector 4 through a meter and a load resistance 9; the voltage of the source 8 may be about 20 volts and load resistance about 2000 ohms. One side of a condenser 10 is connected to the base 2, and this condenser can be charged positively or negatively as desired by operation of a switch 12 to make connection with one terminal or the other of a source 11, The condenser 10 may then be connected by way of another switch 14 and a resistor 15 to the discharge electrode 6 to ionize the gas and so to cause a momentary glow discharge in the tube. The glow discharge may be of the order of 0.1 milliampere flowing for .001 second.

Figure 4:
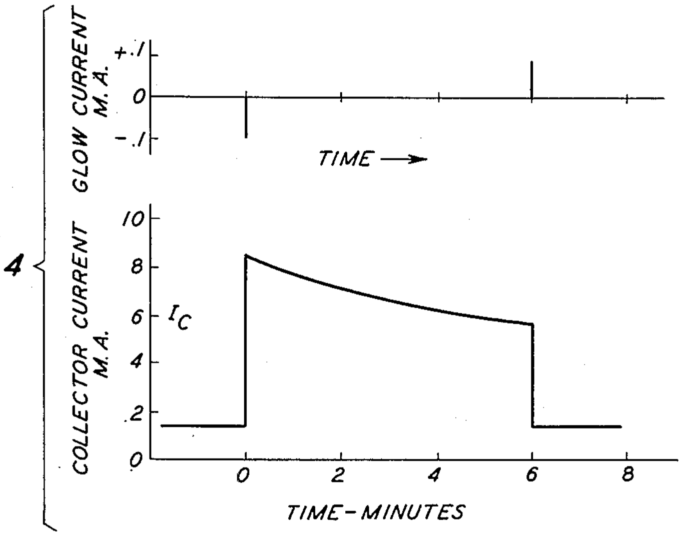
Fig. 4 is a wave-form diagram illustrating the storage features.

Typical behavior of such a storage tube is shown in Fig. 4, where the semiconductor block 1 is of N-type germanium with its exposed surface covered with a thin film of germanium oxide, and the collector 4 is a phosphor-bronze wire. The upper diagram shows the corresponding collector current as a function of time. The collector current was initially 1.5 milliamperes and remained so until the time indicated as zero in the figure, when a momentary glow discharge was passed through the tube, with negative current flowing toward the germanium. This increased the conductance at the point of contact, and the collector current increased to 8.5 milliamperes. The increase in collector current persisted after the momentary glow discharge ceased and until a momentary glow discharge was passed in the reverse direction. This caused the contact to return to its normal conductance, and the collector current dropped back to 1.5 milliamperes.

The change in conductance at the collector contact may be explained as follows. The exposed surface of the germanium surrounding the contact is covered with the thin film 3 of germanium oxide, which is an insulator. When a glow discharge occurs in the tube with negative current flowing toward the germanium, it imparts a negative charge to the surface of this insulating film. This charge causes a strong electric field in the semiconductor immediately beneath this film, and the field increases the conductance of the germanium to the point contact. This so-called field effect is thought to occur in the following manner. There is evidence that positive holes flow easily from germanium into a metal and that electrons do not flow easily in the reverse direction, and this means that the conductance to a collector contact is profoundly affected by the density of positive holes in the germanium adjacent to the contact. (See Physical Principles Involved in Transitor Action, by J. Bardeen and W. H. Brattain, Physical Review, vol. 75, pages 1208–1225.) The electric field due to the negative charge on the film causes an increase in the density of positive holes in the semiconductor immediately underneath the film and so causes a decided increase in the conductance to the collector contact. The charge remains on the film after the momentary glow ceases, and so the increased collector conductance continues too. But the germanium oxide film 3 is not a perfect insulator, the charge leaks off slowly into the semiconductor, and the conductance decreases slowly with time, having a half-life of about 10 minutes, as indicated in the lower diagram. A momentary glow discharge in the reverse direction causes positive ions to flow to the surface of the insulating film, they neutralize the negative charge on the film, and the conductance drops back to its normal value. This is shown in Fig. 4 to have occurred after six minutes.

The glow discharge in the reverse direction undoubtedly imparts a positive charge to the insulating film 3, and it might be thought that this charge would decrease the conductance below its normal value; but the positive charge does not actually do so. This may be explained as follows. There are normally very few positive holes in the germanium, and any further decrease in their number does not greatly affect its conductance. On the other hand, the positive charge does tend to increase the density of electrons in the germanium immediately adjacent to the film, and they tend to increase the conductance at the collector contact; but they are not very effective because there is little electronic conduction across the barrier which is believed to exist immediately below the point of contact of the collector 4 with the semiconductor 1. Thus, the net effect of the positive charge is to cause only a minor change in conductance, and it can be neglected in the actual operation of a storage tube.

Any semiconductor that exhibits a large field effect can be used in practicing the invention. A P-type semiconductor, of course, operates in the reverse manner to that described in the preceding paragraphs, a positive charge on the insulating film 3 operating to increase the current flowing from the collector 4 to the semiconductor 1. At present, the semiconductors that exhibit the largest field effects are N-type germanium and P-type germanium, and the former is preferred because it is more easily prepared and because it is more rugged in maintaining its characteristics. The remainder of this description is therefore presented, for illustrative purposes, on the assumption that the semiconductor is N-type germanium.

The exposed surface of the germanium may be prepared by polishing with 900-mesh alumina, etching two minutes in a solution containing 10 per cent hydrofloric acid and 6 per cent hydrogen peroxide, and finally coating the surface with the thin insulating film. The film is composed of a suitable insulating material, such as germanium oxide, boron oxide, aluminum oxide, or magnesium oxide. Germanium oxide is preferable, and the film is formed by baking the germanium at 400° C. to 500° C. for a few hours in moist air. The insulating properties of the film are determined by the heat treatment and the amount of moisture present in the air, greater heat, greater moisture, and longer treatment producing the more highly insulating films. Films can be prepared which retain substantially all their charge for many minutes after the passage of a glow discharge, and other films can be prepared in which the charge leaks off in a few seconds. By controlling the oxidization process and a subsequent sorting of the tubes, it is possible to provide tubes with a wide variety of characteristics in their time behavior, that is, in the rate at which they return to their normal conductance after the passage of a momentary glow discharge.

As a medium for the glow discharge, a storage tube is filled with an inert gas at a reduced pressure, and argon or neon may be used for this purpose. The tube is filled to a pressure that gives the minimum breakdown voltage of the gas. This pressure may be calculated from Carr's equation when the Carr constant of the gas is known. (See Conduction of Electricity through Gases, J. J. Tompson, second edition, pages 444–451.) But in practice, it is preferred to determine empirically the pressure that gives the minimum breakdown voltage for a particular gas and a particular tube structure and then to use that pressure in the construction of tubes. For argon and a discharge electrode located 5 millimeters away from the base electrode, this pressure is about 4 millimeters of mercury. The value of the minimum voltage breakdown depends on the gas and the metal of which the base 2 and the discharge electrode 6 are constructed. Argon at 4 millimeters of mercury breaks down, when the electrodes are of aluminum, and passes a glow discharge at about 120 volts. Nickel electrodes coated with partially reduced calcium and barium oxides, in the manner well known in the cold-cathode tube art, give breakdown voltages well below 100 volts.

The collector wire 4 may be made of phosphor-bronze or tungsten. The former is preferable when the tube is designed to operate into a low impedance load, and the latter is preferable for a high impedance load. A preliminary forming process is advantageous for a phosphor-bronze contact. In this process, a $\frac{1}{10}$ microfarad condenser is repeatedly discharged through the collector contact in its high resistance direction and with a high resistance in series with the contact. The latter is gradually reduced until the discharge causes a decided decrease in the contact resistance, that is, until it passes about one milliampere at 20 volts.

Figure 5:
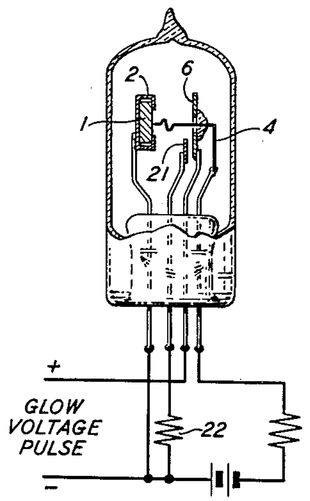
Fig. 5 shows an alternative form of the invention designed to cause the glow discharge to pass at a low voltage.

To meet the requirements in various circuit applications, the invention may be constructed in other forms than the one shown in Fig. 1. Thus, Fig. 5 shows a storage tube that will break down and pass a glow discharge at a low voltage. A pilot electrode 21 in the form of a wire is included in the tube with only a short separation between it and discharge electrode 6, and the pilot electrode is strapped to the base 2 through a high resistance 22. Electrodes 6 and 21 are also coated with partially reduced alkali earth oxides to reduce the breakdown voltage in the manner previously described. The application of 60 to 80 volts to the leads from the base and discharge electrode causes a pilot discharge to pass in the short gap between electrodes 6 and 21. This discharge spreads to the base and causes the change in conductance at the collector contact. The use of a pilot discharge to give a low breakdown voltage is well known in the vacuum tube art.

Figure 6:
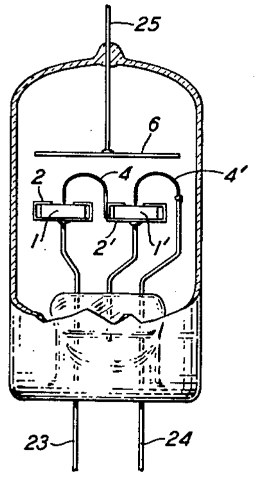
Fig. 6 is a view of a storage tube with diodes connected in series for operation into a high impedance circuit.

Another form of the invention is shown in Fig. 6, where the tube contains diodes in series for operation into a very high impedance load. The tube is shown as containing two diodes in series. The first diode comprises a germanium block 1 and a base 2 and a collector 4; the second diode comprises a germanium block 1′, a base 2′, and a collector 4′. The collector 4 of the first diode is connected to the base 2′ of the second one, and output leads 23 and 24 are connected, respectively, to the base of the first diode and the collector of the second. The tube also contains a common discharge electrode 6 with an exterior lead 25, and the discharge voltage is applied to leads 23 and 25. The glow discharge passes to both bases because they are electrically connected through germanium block 1 and collector 4, and the diodes thus operate simultaneously in series.

Figure 7:
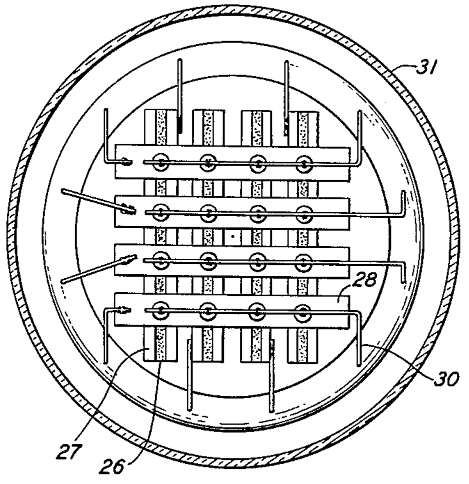
Figs. 7 and 8 show an embodiment of the invention comprising an array of diodes enclosed in a common glass envelope.
Figure 8:
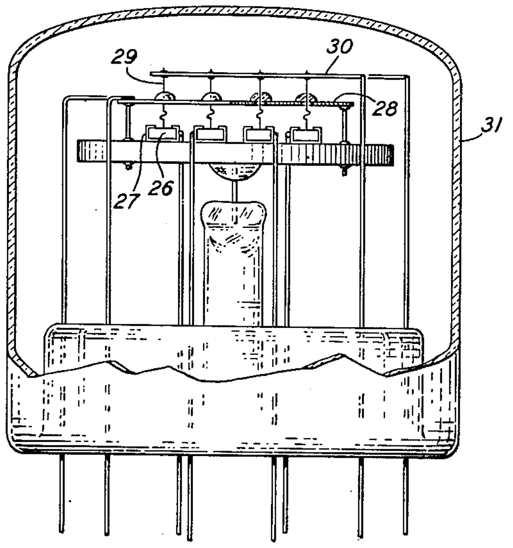

A storage tube with a multiplicity of diodes arranged in a rectangular array or cross-net is shown in Figs. 7 and 8, where Fig. 7 is a top view of the tube and Fig. 8 is a side view. The tube contains four elongated blocks or strips of germanium 26 embedded in elongated metal bases 27, and the exposed surfaces of the germanium blocks are coated with insulating films in the manner previously described. These germanium strips are crossed by four discharge electrodes 28 located a short distance above the former. Four collector wires 29 are mounted in ceramic leads on each discharge electrode and pass through apertures in the electrode to make contacts with the germanium strips below. The four collectors mounted on any one discharge electrode are connected to a common lead 30. The array thus comprises a cross-bar grid of 16 diodes, in which the four bases are crossed by four discharge electrodes and by four rows of collectors. Each base, discharge electrode, and row of collectors is provided with an individual lead from the glass envelope 31. The envelope is filled with gas at a reduced pressure; and when sufficient voltage is applied between any one of the bases and any one of the discharge electrodes, it causes a glow discharge to pass in the region where they cross and a corresponding change in the conductance of the diode located at that point. This change in conductance can then be utilized in any circuit connected to that particular base and to the collectors of the row passing through the point of discharge. The arrangement thus permits a two-dimensional conductance pattern to be stored in the tube and then utilized for subsequent operations in an output circuit. An example of such storage is illustrated below.

To prevent the spread of the discharge from the point where it is initiated to others of the collectors, a higher pressure of gas is recommended for the multiple diode tube of Figs. 7 and 8 than for the single diode tube of Figs. 1 and 5 or the simultaneously operative double diode tube of Fig. 6.

The invention, in the forms previously described, may have various applications in electrical circuits, and some of these applications are illustrated by the following examples.

Figure 9:
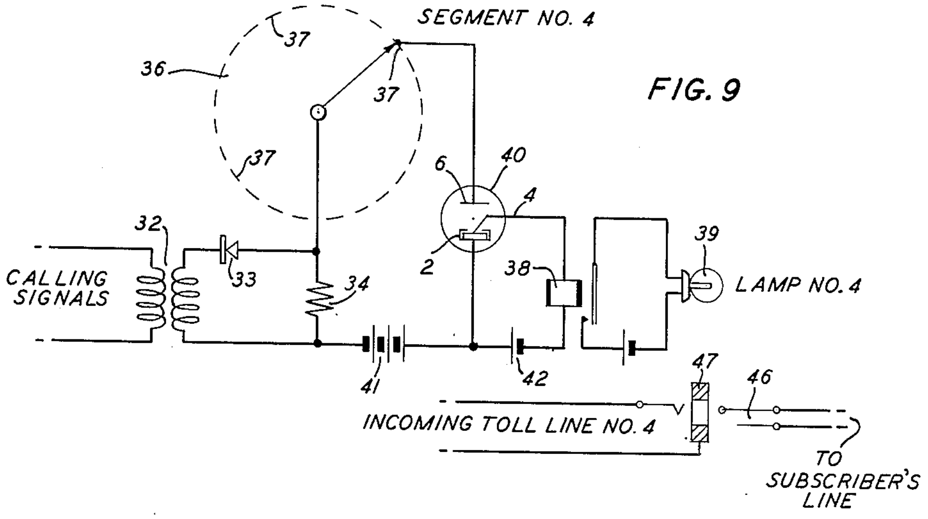
Fig. 9 illustrates an application of the invention as a holding device in a telephone signalling system.

In the example shown in Fig. 9, a storage tube acts as a holding device in the terminal station of a telephone toll system, where a group of 24 toll lines have their calling signals coming in over a common time-multiplex channel. The incoming calling signals are applied by way of a transformer 32 and a rectifier 33 to a resistor 34, and the resulting unipolar voltage is applied to the moving element of a distributor 36 having a number of segments 37. This apparatus, which is shown schematically as a mechanical commutator but which, of course, may be electronic, distributes the calling signals to the corresponding switchboard lamps. For example, segment No. 4 on the distributor 36 is associated with toll line No. 4; and when a call comes in over that line, its time-multiplexed calling signal is delivered to switchboard lamp No. 4. But the electrical pulses from the distributor do not constitute a sustained current. They may be of only $^1/_{120}$ second duration, and they may occur only five times per second. Thus, they are unable to close a relay 38 and light a switchboard lamp 39. But storage tubes 40 of the type shown in Fig. 1 or Fig. 5 may be employed as holding elements to assist in this operation. Referring to Fig. 9, the incoming calling signals are superimposed on a common biasing voltage from a source 41 and applied to the rotor of the distributor 36, and each segment 37 of the latter is connected to the discharge electrode 6 of one of a like number of tubes 40, while the base 2 of the tube is connected to the positive terminal of the biasing voltage source 41. The output terminals of the tube, i. e., the collector 4 and the base 2, are connected through a battery 42 to the relay 38. The closure of this relay lights switchboard lamp 39 associated with toll line No. 4. When a calling pulse is distributed to segment No. 4, indicating that a call is coming in over the corresponding toll line, it causes a momentary glow discharge in the tube 40 and a decided increase in collector current in the manner previously described. This increase in current persists after the passage of the glow discharge, and the relay 38 closes and lights the associated switchboard lamp 39. When the local operator sees this light, she may insert a plug 46 into a jack 47 of toll line No. 4, completing the connection for the incoming call. This operation is signalled in the usual way to the calling operator who then discontinues her calling signal, and pulses are no longer distributed to the tube. For this purpose, the decay time of the holding tube 40 may be adjusted to only a few seconds; that is, the collector current drops back to its normal value in a few seconds after the glow discharges have ceased. The normal current is too small to hold the relay closed, so it opens in a few seconds after the telephone connection is completed, and the switchboard lamp is turned off.

Figure 10:
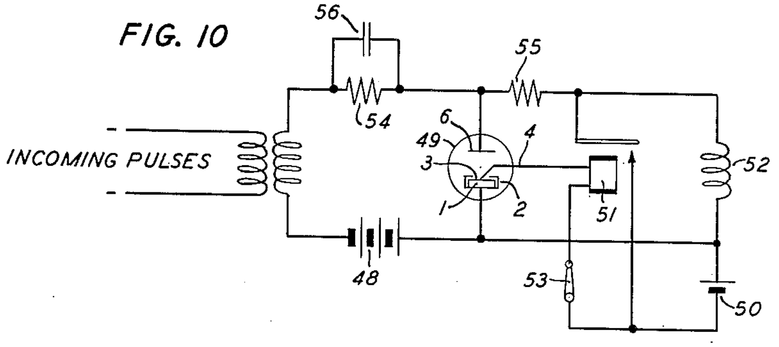
Fig. 10 shows apparatus in which a sequence of small changes in conductance are stored and superimposed for passing current to operate a relay.
Figure 11:
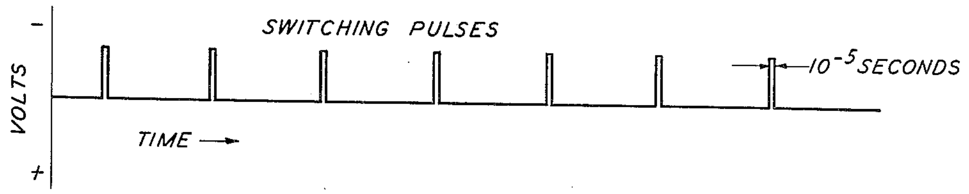
Fig. 11 illustrates a sequence of pulses suitable to operate the relay of Fig. 10.

Fig. 10 illustrates an application of the invention in which small increases in conductance are stored from one momentary glow discharge to another and their sum utilized for an operation in an electrical circuit. In high frequency communication systems utilizing pulse groups, it is sometimes desirable to operate a telephone relay with a train of very short electrical pulses, for example, with the train illustrated in Fig. 11. The pulses may be only a few microseconds in duration and may occur at intervals of a few milliseconds, as shown in the figure. They are in themselves of insufficient energy to operate a telephone relay, and a single pulse is too brief to cause a decided change in conductance through a diode, by a glow discharge, as described in previous sections of the memorandum. But the present invention may nevertheless store and sum the small changes in conductance caused by successive pulses, and the sum may be utilized for operating a relay. This may be accomplished with the circuit shown schematically in Fig. 10. The discharge electrode 6 of a storage tube 49 is biased negatively close to ionizing potential by the voltage of a battery 48 acting through a voltage divider 54, 55. The incoming train of pulses is superimposed on this negative biasing voltage and applied by way of a bypass condenser 56 to the discharge electrode 6 of the tube 49. The collector 4 and the base 2 of this tube are connected through a battery 50 to the winding on relay 51. This relay is assumed to have a high inductive load 52 in its output circuit which impresses a momentary high voltage across the relay contact when the latter is opened, and one side of the relay contact is connected to the glow discharge electrode 6, as shown in the figure. When a train of pulses arrives in the input circuit, each pulse causes a momentary glow discharge in the tube and adds a small negative charge to the insulating film 3 on the surface of the germanium block 1. These charges remain on the film and add up from each momentary glow discharge to the next. The arrival of several pulses thus charges the film to a substantial voltage with respect to the germanium, this charge causes a decided increase in the conductance of the diode, and the increased current through the latter closes the relay. With a decay time for the tube of a few seconds or more, the decay of the charge between any pulse and the following pulse, which occurs within a few milliseconds, is negligible. When it has performed its function, the relay is released by opening a switch 53. This operation also erases the increased conductance in the diode, for the opening of the relay contact causes the inductive load 51 to impress a high positive voltage on discharge electrode 6, and the momentary glow discharge in the tube is in such a direction that it erases the negative charge on the insulating film and restores the diode to its normal state. The switch 53 is then closed again, and the circuit is prepared for future operations.

Figure 12:
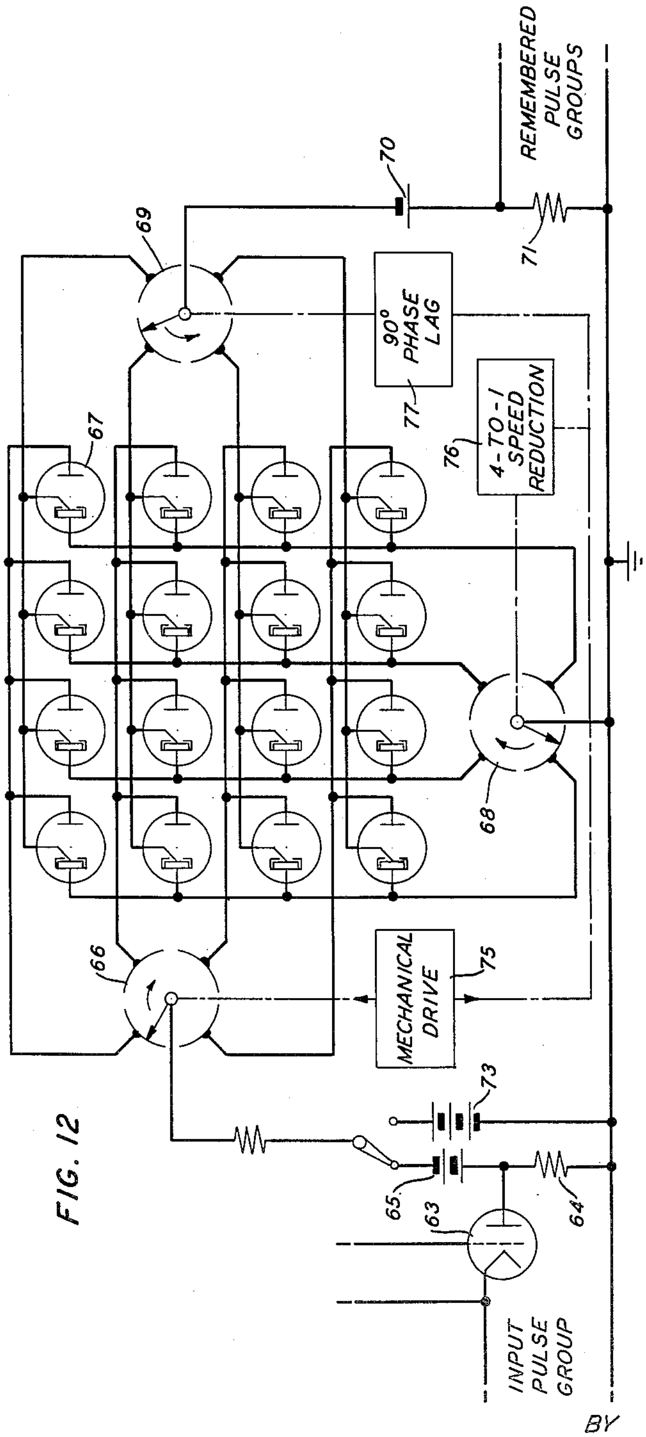
Fig. 12 is a schematic diagram showing a memory circuit for storing a train of pulses in a bank of storage tubes.
Figure 13:
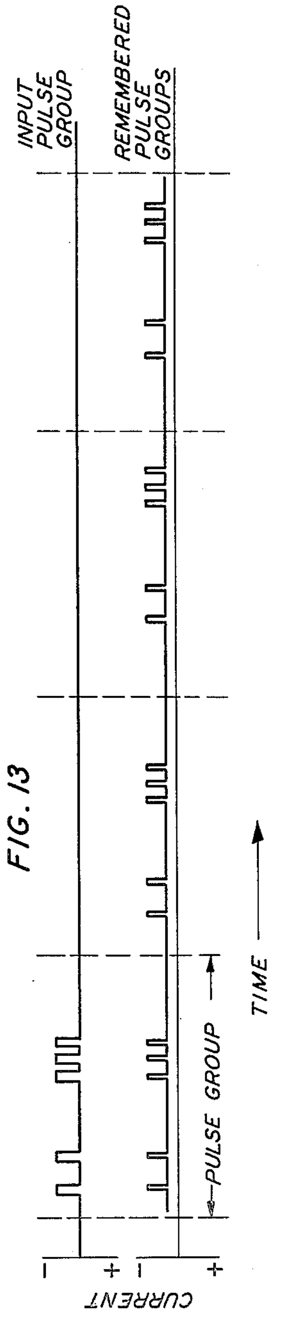
Fig. 13 is a diagram illustrating the operation of the apparatus of Fig. 12.

Figs. 12 and 13 illustrate the invention as embodied in a memory circuit. In communication systems utilizing pulse groups, it is sometimes desirable to store a particular group of pulses and retain them for operations at a subsequent time. In such systems, the incoming signal is a train of electrical pulses following each other in preassigned time positions, and gates and distributors can therefore be synchronized with the pulse train by means well known in the communication art. The upper graph in Fig. 13 shows an example of a pulse group that may be stored in the circuit. The group covers sixteen assigned time positions, with pulses present in the second, fourth, ninth, tenth, and eleventh time positions. The circuit stores the group for any desired length of time and reproduces it periodically, as shown in the lower graph of Fig. 13. The memory circuit is shown schematically in Fig. 12. Its input contains an electronic gate 63, which opens to admit the pulse group to be stored, and the admitted pulses appear on a resistor 64 and are superimposed on the negative biasing voltage of a source 65 and applied to the rotor of an input distributor 66. The storage device may comprise a grid of 16 storage tubes 67 arranged in four rows and four columns with their electrodes connected in the manner of a cross-net. All discharge electrodes in any one row are connected in common to a segment of the input distributor 66, the bases in any one column are connected to a segment of an intermediate distributor 68, and the collectors in any one row are connected to a segment of an output distributor 69. The other discharge electrodes, bases, and collectors are similarly connected to the other segments. The intermediate distributor 68 has four segments and rotates once per pulse group period. It commutates the columns of bases and connects them successively to ground. The input distributor 66 has four segments. It rotates four times per pulse group period and distributes the incoming pulses to the rows of discharge electrodes in the tubes. The output distributor 69 operates in a similar manner and commutates the rows of collectors to the output load 71, the latter being connected to ground and to the rotor of the distributor 69 through a battery 70. Apparatus of well-known type, including a driver 75, a speed reduction box 76, and a phase lag device 77, may be provided to ensure that this distributor shall operate in synchronism with but a step behind the input distributor 66 to prevent any interference between storage and reproduction. With this arrangement, an incoming pulse in any time position is impressed on the base and discharge electrode of a corresponding tube in the grid. The pulse promotes a brief glow discharge in that tube and so a decided increase in conductance through the collector contact, and this increase persists after the passage of the glow discharge. The group of pulses is thus recorded as a conductance pattern in the cross-net of tubes. The intermediate and output distributors continue to scan the grid, and they successively connect the collectors and their associated bases into the load 71. The battery 70 causes a large current output to flow through each diode that has an increased conductance, and the group of pulses is thus repeatedly reproduced in the output circuit, as illustrated in the lower sketch of Fig. 13. The device remembers the pulse group and repeats it periodically in the output circuit. The stored pattern can be erased at will by turning switch 72 to connect the positive terminal of a voltage supply source 73 to the input distributor, whereupon a momentary glow discharge passes through all the storage tubes in succession and in the direction to cause the diodes to return to their normal conductance. This erases the stored pattern in the grid.

For simplicity of explanation, the preceding memory circuit was described as comprising a bank of individual storage tubes. It is preferred, however, to replace the bank of tubes with a single storage tube containing a multiplicity of diodes, as described above and shown in Figs. 7 and 8. The diodes in this tube are arranged in rows and columns, with a common base for each column, a common discharge electrode for each row, and a common lead to all collectors in any one row. Such a multidiode tube can be connected into the memory circuit in the same manner as the bank of tubes, and it then operates in the manner described.

What is claimed is:

1. Apparatus which comprises a body of semiconductor material, a metallic electrode making contact therewith, the resistance of said contact being sensitive to the presence of electric charge in its vicinity, a film of insulation on a surface of said body adjacent said contact, an ionizable gas adjacent said film, and means for ionizing said gas to produce a localized surface charge on said film.

2. In combination with apparatus as defined in claim 1, means for removing said localized surface charge at will.

3. In combination with apparatus as defined in claim 1, means for regulating the persistance of said surface charge.

4. Apparatus which comprises a body of semiconductor material, a superficial film of insulation on a face of said body, electrodes engaging said body, an ionizable gas adjacent said film, a work circuit interconnecting said electrodes, and means for ionizing said gas to apply an electric surface charge to said film, thereby to alter the resistance of said body and the current in said work circuit.

5. Apparatus as defined in claim 4, wherein at least one of the electrodes makes a rectifier connection with the body and wherein the resistance of said rectifier connection is sensitive to the presence of an electric charge on the surface of the film.

6. Apparatus as defined in claim 5, wherein said one electrode makes point contact with said body.

7. Apparatus as defined in claim 6, wherein said point contact electrode pierces the insulation film to make contact with the body below the film.

8. Apparatus which comprises a body of semiconductor material, a metallic electrode making contact therewith, the resistance of said contact being sensitive to the presence of electric charge in its vicinity, a film of insulation on a surface of said body adjacent said contact, a supply of an inert ionizable gas adjacent said film, means for applying a momentary pulse to ionize said gas, and means for generating at said film a voltage gradient of a magnitude sufficient to cause gas ions to settle on said film.

9. Apparatus as defined in claim 8, wherein the semiconductor material is germanium.

10. Apparatus as defined in claim 8, wherein the metallic electrode makes point contact with the semiconductor body.

11. In combination with apparatus as defined in claim 8, means for biasing the semiconductor-to-metal contact in the reverse direction.

12. Apparatus as defined in claim 8, wherein the semiconductor is of N-type conductivity and wherein the polarity of the voltage gradient is such as to attract negative gas ions to the film.

13. Apparatus as defined in claim 8, wherein the semiconductor is of P-type conductivity and wherein the polarity of the voltage gradient is such as to attract positive gas ions to the film.

14. In combination with apparatus as defined in claim 1, a current source and a marginal relay connected in series with the metal-to-semiconductor contact, the current of said source being insufficient by reason of the high resistance of said contact to actuate said relay in the absence of a surface charge on said film, the current of said source being sufficient, when said contact resistance is reduced by said surface charge, to actuate said relay.

15. Apparatus which comprises a body of semiconductor material, a superficial film of insulating material on a face of said body, an ionizable gas adjacent said film, a plurality of individual point contact electrodes individually piercing said film and making contact with said body at spaced locations, individual work circuits connected to the several electrodes, and means for ionizing the gas in the vicinity of a selected one of said point contact electrodes.

16. Apparatus which comprises a body of semiconductor material, a plurality of metallic electrodes individually connected thereto, the resistance of each of said connections being sensitive to the presence of electric charge in its vicinity, a film of insulation on a surface of said body adjacent said connections, an ionizable gas adjacent said film, and means for ionizing the gas in the vicinity of a selected one of said connections, there to produce a localized surface charge.

17. Apparatus which comprises a body of semiconductor material, a plurality of metallic electrodes individually connected thereto, the resistance of each of said connections being sensitive to the presence of electric charge in its vicinity, a film of insulation on a surface of said body adjacent said connections, an ionizable gas adjacent said film, and means for generating at said film in the vicinity of a selected one of said connections, a voltage gradient of a magnitude sufficient to ionize said gas.

FRANK GRAY.

No references cited.